(12) United States Patent
Strumolo

(10) Patent No.: US 6,687,577 B2
(45) Date of Patent: Feb. 3, 2004

(54) SIMPLE CLASSIFICATION SCHEME FOR VEHICLE/POLE/PEDESTRIAN DETECTION

(75) Inventor: Gary Steven Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,067

(22) Filed: Sep. 13, 2002

(65) Prior Publication Data

US 2003/0114964 A1 Jun. 19, 2003

Related U.S. Application Data

(60) Provisional application No. 60/340,879, filed on Dec. 19, 2001.

(51) Int. Cl.[7] .............................................. G05D 1/00
(52) U.S. Cl. ......................... 701/1; 701/301; 348/116; 342/70
(58) Field of Search ..................... 701/1, 301; 348/116, 348/118, 148, 143; 342/70, 118, 175

(56) References Cited

U.S. PATENT DOCUMENTS

| | | | | |
|---|---|---|---|---|
| 5,253,050 A | * | 10/1993 | Karasudani | 348/118 |
| 5,410,346 A | * | 4/1995 | Saneyoshi et al. | 348/116 |
| 6,018,308 A | | 1/2000 | Shirai | 342/70 |

\* cited by examiner

*Primary Examiner*—Marthe Y. Marc-Coleman
(74) *Attorney, Agent, or Firm*—Artz & Artz, P.C.; Frank A. MacKenzie

(57) ABSTRACT

A classifying system 10 for a host vehicle 12 includes a sensor 14 and a controller 24 coupled to the host vehicle 12. The sensor 14 detects boundary data of an obstacle 16, 18, 20 and 22. The sensor 14 also generates an obstacle signal, which is received by the controller 24, which then generates a bounding box 26, 28, 30 and 32 for the obstacle 16, 18, 20 and 22. The bounding box 26, 28, 30 and 32 includes a number of vertical pixels 40, corresponding to a maximum height of the obstacle 16, 18, 20 and 22, and a number of horizontal pixels 42, corresponding to a maximum width of the obstacle 16, 18, 20 and 22. The controller 24 includes obstacle classifying logic activating in response to height and width of the obstacle 16, 18, 20 and 22 within parameters of one of a plurality of objects.

21 Claims, 5 Drawing Sheets

SIMPLE CLASSIFICATION SCHEME FOR VEHICLE/POLE/PEDESTRIAN DETECTION

CROSS REFERENCE TO RELATED APPLICATIONS

The present invention claims priority to Provisional Application No. 60/340,879 filed on Dec. 19, 2001.

BACKGROUND OF INVENTION

The present invention relates generally to external object recognition for vehicles, pedestrians, and other items and more particularly to an obstacle classification system for use in moving vehicles.

Due to the current density of traffic on the roads, motor vehicle operators are flooded with information. Consequently, operating a motor vehicle is a complex procedure in which various situations arise where the operator has limited, little, or no time to react or to manually engage safety measures.

Many crash detection systems incorporate crash detection algorithms based on sensed data. The application of remote sensing systems using radar, lidar, and vision based technologies for obstacle detection, tracking, alarm processing, and potential safety countermeasure deployment is well known in the art.

To perform pre-crash sensing, vehicle sensors should not only detect possible threats but classify them as well. Such classifications are often broken down into different target categories, such as: vehicle, wall, pole, and pedestrian.

For situations involving the target vehicle category, it is also useful to determine the direction and angle of the target vehicle and its type, e.g., frontal view of a car, side view of an SUV, and rear view of a large truck, for proper collision avoidance and safety measure engagement.

Current classification techniques match the image of the target obstacle to a database template. This is useful only if the obstacle (or something very close to the obstacle) appears in the template.

The limitations associated with current obstacle classification techniques have made it apparent that a new technique for obstacle and classification is needed. This new method should include a set of classifying parameters for a number of objects and should operate for various discrepancies within the individual classifications.

SUMMARY OF INVENTION

In accordance with one aspect of the present invention, an obstacle classifying system for a host vehicle having at least one sensor, adapted to detect at least boundary data of an obstacle, coupled to the host vehicle, is disclosed. The sensor is further adapted to generate an obstacle signal.

A controller, also coupled to the host vehicle, is adapted to receive the obstacle signal and generate a bounding box for the obstacle in response to the obstacle signal. The controller also includes classifying logic.

The bounding box includes at least one vertical pixel, corresponding to a maximum height of the obstacle, and at least one horizontal pixel, corresponding to a maximum width of the obstacle.

The host vehicle classifying logic is adapted to activate in response to the height and width of the obstacle within obstacle parameters and to classify a type of obstacle based on obstacle height and the obstacle width.

In accordance with another aspect of the present invention, an obstacle classifying method for a host vehicle comprising: detecting an obstacle through at least one sensor coupled to the host vehicle; generating an obstacle signal; receiving said obstacle signal in a controller coupled to the host vehicle; generating a bounding box around an image of said obstacle in response to said obstacle signal, said bounding box including a number of vertical pixels corresponding to a height of said obstacle and a number of horizontal pixels corresponding to a width of said obstacle; activating vehicle classifying logic in response to said height and said width of said obstacle within vehicle parameters; classifying a type of a target vehicle based on said obstacle height; estimating a rotation angle of said target vehicle in relation to the host vehicle; activating said other object classifying logic in response to said height and said width of said obstacle within other object parameters; and classifying said obstacle based on at least one of said obstacle height and said obstacle width.

Additional objects and features of the present invention will become apparent upon review of the drawings and accompanying detailed description of the preferred embodiments.

BRIEF DESCRIPTION OF DRAWINGS

For a more complete understanding of the invention, there will now be described some embodiments thereof, given by way of example, reference being made to the accompanying drawings, in which.

DETAILED DESCRIPTION

The present invention is illustrated with respect to an obstacle classifying system for a host vehicle, particularly suited to the automotive field. However, the present invention is applicable to various other uses that may require obstacle classification as will be understood by one skilled in the art.

Figure 1:
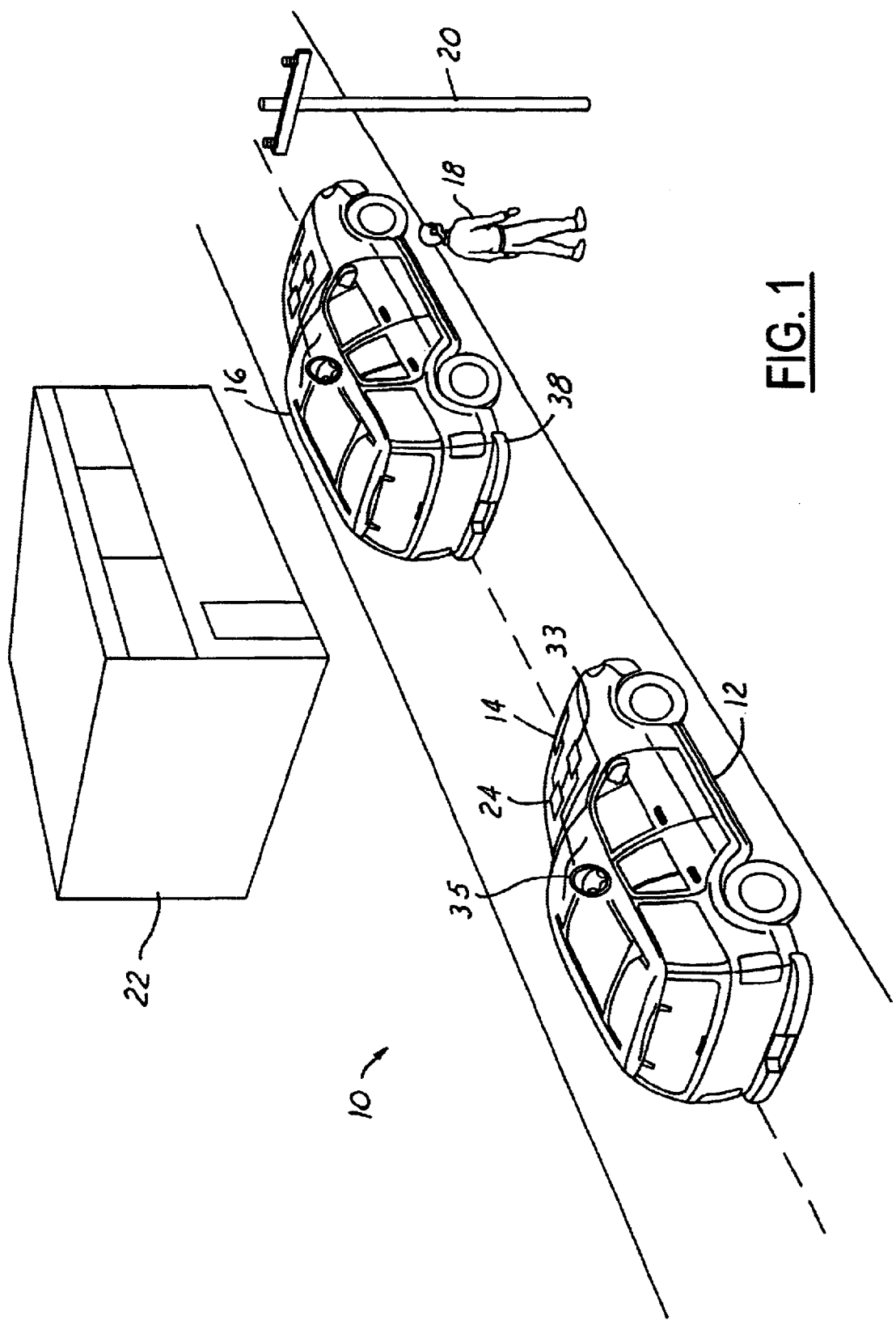
FIG. 1 is a perspective view of an obstacle classifying system for a host vehicle according to one embodiment of the present invention.
Figure 2:
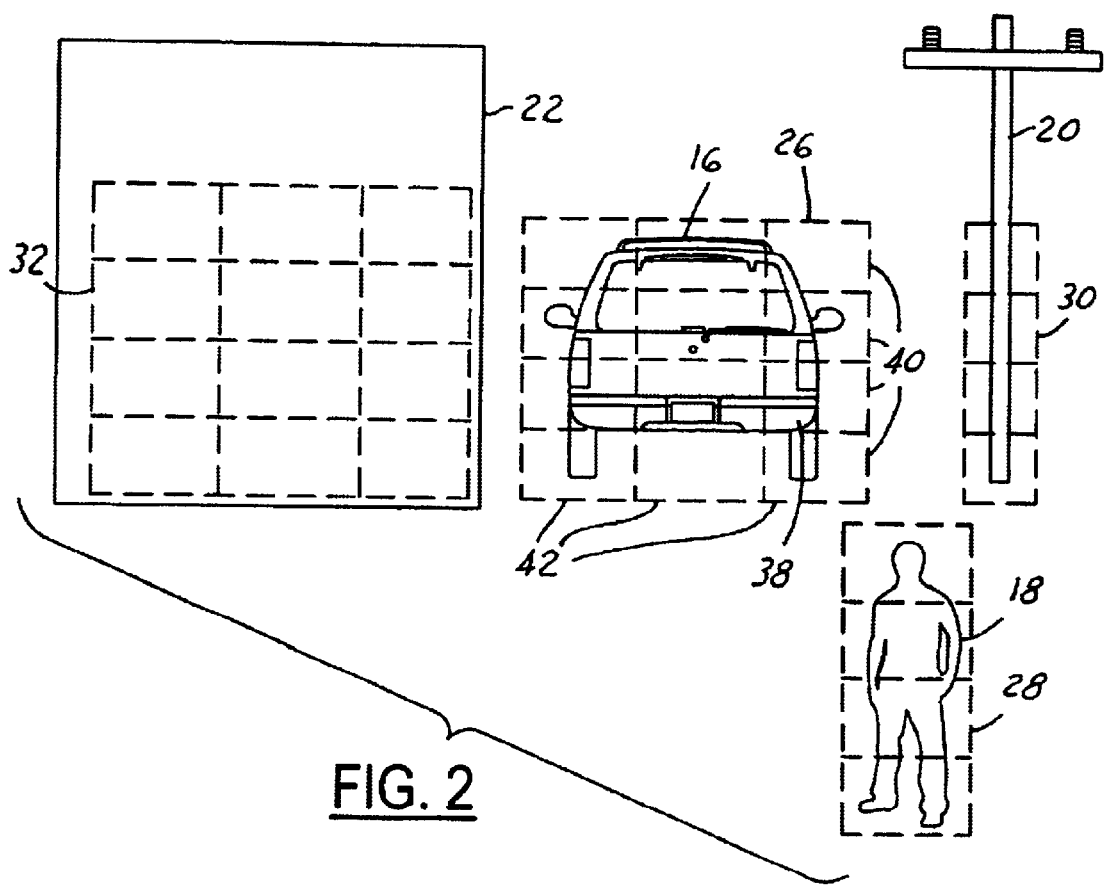
FIG. 2 is a sensor image view from the host vehicle of FIG. 1.
Figure 3:
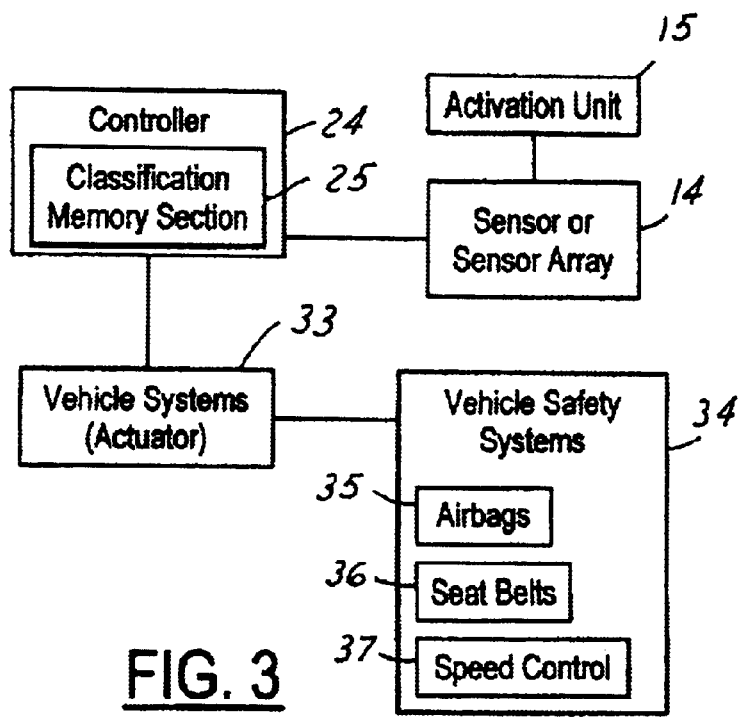
FIG. 3 is a block diagram of the control system from the host vehicle of FIG. 1.

Referring to FIGS. 1, 2 and 3, a classifying system 10 for a host vehicle 12 including at least one sensor 14 coupled to the host vehicle 12, which detects obstacles, in accordance with one embodiment of the present in invention, is illustrated. Alternate embodiments include an activation unit 15 for activating the sensor 14, as will be understood by one skilled in the art. Obstacles include target vehicles 16, pedestrians 18, telephone poles 20, walls 22, and any other object that may potentially affect vehicle travel. A controller 24, also coupled to the host vehicle 12, receives the obstacle signal and responds by generating an image of a boundary box such as 26, 28, 30 and 32 around either one obstacle or individual boxes around each individual obstacle 16, 18, 20 and 22 in view, which will be discussed later. The controller 24 further contains classifying logic and a memory section 25 containing classifying parameters for analyzing the image or images and generating signals therefrom, which will also be discussed later. Various vehicle systems 33, such as an actuator for a host vehicle safety system 34, receive controller signals and activate responsive measures, such as airbags 35, seatbelts 36, and speed control systems 37, as will be understood by one skilled in the art.

The present invention is illustrated with respect to at least one sensor 14, however, one skilled in the art would realize that multiple sensors in various array configurations could provide required system data. Examples of embodied sensors include radar, lidar and vision based sensors and any other sensor types or combinations thereof.

The sensor 14 detects at least boundary data of the obstacles, however, in the current embodiment, the sensor 14 receives boundary, velocity, and distance data from the obstacle, such as the target vehicle 16, as will be understood by one skilled in the art. The sensor 14 further generates an obstacle signal. The obstacle signal, in the current embodiment, is the data acquired when the sensor 14 focuses on a single obstacle, or, as illustrated, various obstacles 16, 18, 20 and 22, within sensor range of the host vehicle 12, as will be discussed later. The sensor 14 alternately senses obstacle specific data such as at least one inside corner 38 of the target vehicle 16. This obstacle specific data provides an increased level of accuracy primarily for situations involving a target vehicle 16 at an angle with respect to the host vehicle 12.

The controller 24 generates a bounding box 26 for the obstacle in response to the obstacle signal, the bounding box 26 includes a number of vertical pixels 40 corresponding to a maximum height of the obstacle and a number of horizontal pixels 42 correspond to a maximum width of the obstacle. The maximum height is the outermost solid parameters of the obstacle from base to apex. The maximum width is the length from the outermost side to side portions of the obstacle. At least one pixel should be included for the height and width respectively, and, in fact, hundreds of pixels in both directions may be needed to bound a large object in the sensor field of view. However, for illustrative purposes four vertical pixels were shown for the target vehicle 16, and three horizontal pixels were shown for the target vehicle 16. The controller 24 further includes vehicle classifying logic and other object classifying logic.

The controller 24 correlates the pixel lengths to physical lengths based on the sensed distance to the target vehicle 16 obtained from, for example, a radar or stereo camera arrangement. Standard image processing techniques are employed to construct a bounding box around the target vehicle 16 yielding the number of pixels.

The pixels, in one embodiment, may be obtained through application of the Hough Transform to the image and detecting the horizontal and vertical lines of the target vehicle 16 or other object 18, 20 or 22. The Hough transform describes feature boundaries for regular curves or straight lines. The primary advantage of the Hough transform is that it is tolerant to gaps in feature boundary descriptions and is relatively unaffected by image noise.

The host vehicle classifying logic of the controller 24 activates in response to the height and the width of the obstacle within vehicle parameters. The various parameters are compared to parameters stored in the memory section 25 to classify the obstacles. The host vehicle parameters include at least two different obstacle heights, H1 and H2, corresponding to height ranges for different vehicle types. An example thereof is that the heights of cars<H1<the heights of SUVs<H2<the heights of trucks. For example, car parameters include the width of the obstacle set at approximately 2 meters corresponding to the viewing of the front or rear of the target vehicle 16 and approximately five meters for a side view of the target vehicle 16. The closer the width is to two meters, the closer the system 10 is to viewing a car head-on, whereas the closer the width is to five meters, the closer the target vehicle is to a side view.

Figure 4:
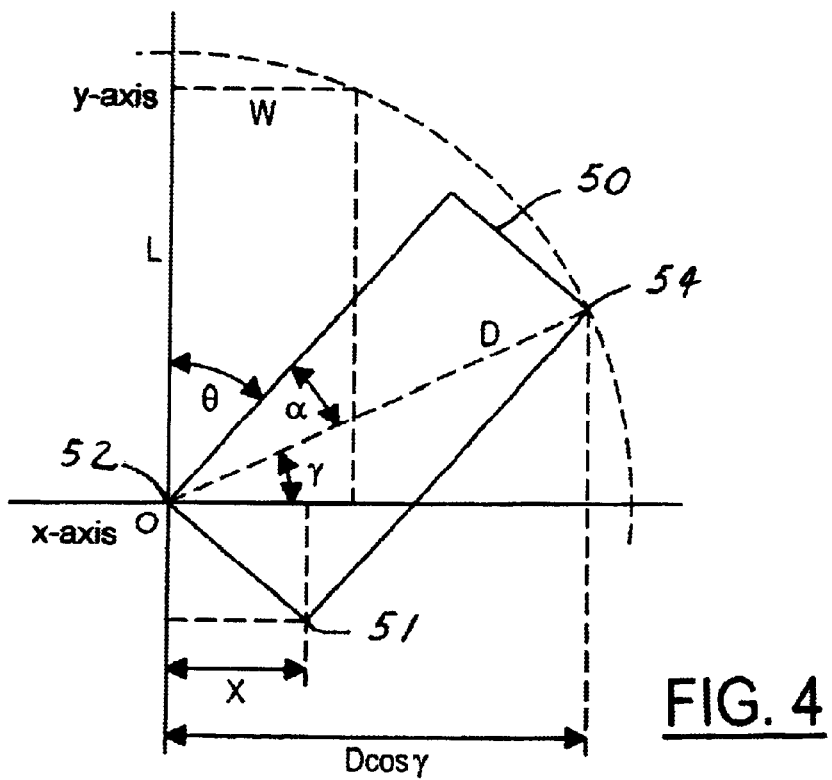
FIG. 4 is a graphical representation of an aerial view of a turning vehicle according to one embodiment of the present invention.
Figure 5:
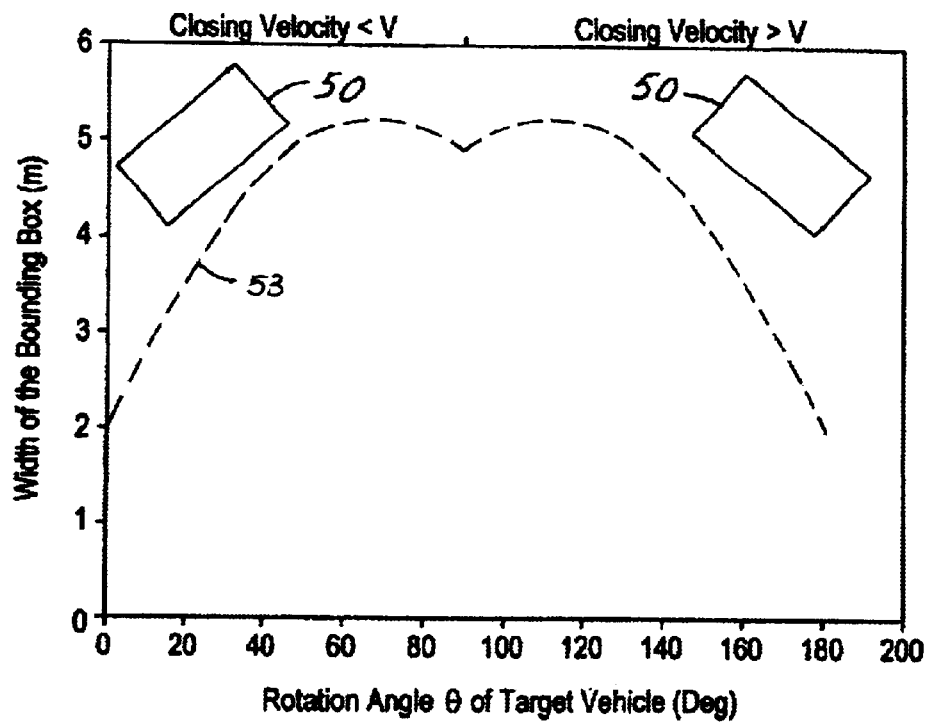
FIG. 5 is a graphical representation of one possible functional relation between the width of the bounding box and the rotation angle of the target vehicle according to one embodiment of the present invention.
Figure 6:
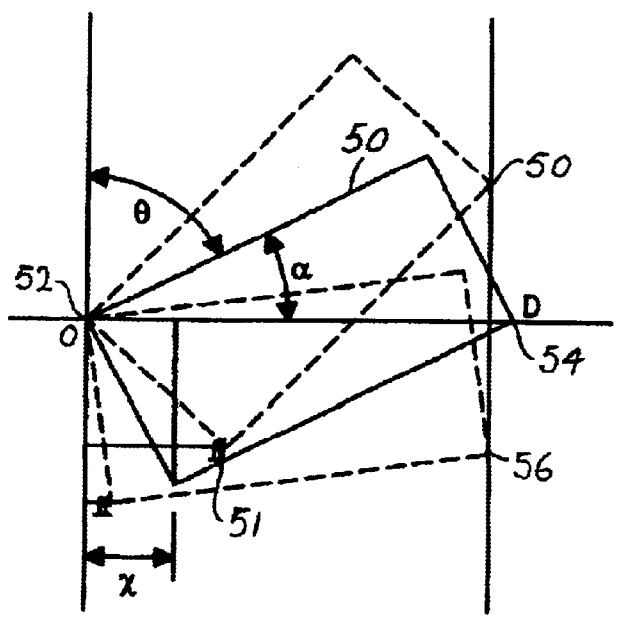
FIG. 6 is a graphical representation of an aerial view of the a turning vehicle at an ambiguous angle from the host vehicle of FIG. 1 according to one embodiment of the present invention.

Referring to FIGS. 4, 5 and 6, a graphical representation of an aerial view of a turning target vehicle 50, according to one embodiment of the present invention, is illustrated. The aforementioned vehicle classifying logic classifies the type of target vehicle 50 based on the obstacle height. It also estimates a rotation angle θ of the target vehicle 50 in relation to the host vehicle and determines a direction of travel of the target vehicle 50 based on the host vehicle velocity and the closing velocity between host and target vehicles.

For example, if the closing velocity between the host vehicle and the target vehicle 50 is greater than the host vehicle velocity alone, the target vehicle 50 is approaching the host vehicle, and the target vehicle 50 is viewed from the front. On the other hand, if the closing velocity is less than the host vehicle velocity, the target vehicle 50 is moving in the host vehicle direction as well, so the host vehicle view of the target vehicle 50 is from the rear. The target vehicle 50 is represented as a rectangle of dimensions W and L such that the corner 52 to corner 54 length D is determined through the equation:

$$D=\sqrt{W^2+L^2}$$

The angle α, with vertex at the origin O, between D and the closest side corresponding to length L is, $$\alpha=\tan^{-1}(W/L)$$

The angle γ between D and the axis normal to the host vehicle is:

$$\gamma = \frac{\pi}{2} - \theta - \alpha$$

The rectangle width w corresponding to the bounding box width read by the host vehicle sensor is determined by the equation, $$w=D\cos\gamma$$

FIG. 5 illustrates a case where a target vehicle of width & length (W and L) is considered where W=2 (meters) and L=5 (meters). Here L is a function of the type of vehicle, e.g. L=4.5 for a car, 5 for an SUV, and 6 for a truck. Once the type of vehicle is obtained based on the height, the appropriate L is selected and the aforementioned equations are implemented to obtain α and D. Using the value of w obtained from the bounding box, converted into physical units as outlined earlier, γ is obtained. Finally, θ, the desired rotation angle of the target vehicle 50, is computed.

Additional accuracy is obtained by sensing the closing velocity of the target vehicle 50 to determine if the target vehicle 50 is approaching the host vehicle or heading away from the host vehicle. In other words, use of the closing velocity eliminates possible incorrect angle calculations. If the closing velocity is greater than the host vehicle velocity, the target vehicle 50 is angled toward the host vehicle, and if the closing velocity is less than the host vehicle velocity, the target vehicle 50 is angled away from the host vehicle. The 'direction of travel' curve 53 is illustrated for closing velocity less than host vehicle velocity and closing velocity greater than host vehicle velocity.

FIG. 6 illustrates the ambiguity in the rotation angle when θ+α approaches π/2 because it is possible for two angles to produce the same apparent width w 55, 56, as will be understood by one skilled in the art. This is resolved by detecting the inside corners, illustrated as corner 51, of the target vehicle 50. The inside corners are read from the actual corners of the target vehicle 50 rather than the outer corners 52, 54 of the bounding box.

By computing the distance from the inside corner 51 to the nearest side and comparing it to the length x, (where x is the distance from the y-axis to the inside corner 51 when viewing the target vehicle 50 diagonal D normally) the ambiguity demonstrated in FIG. 6 is easily resolved.

$$x = \frac{D\tan^2(\alpha)}{1+\tan^2(\alpha)} = \frac{DW^2}{L^2+W^2}$$

One skilled in the art will realize the angle θ more closely approximates the actual orientation angle of the target vehicle 50.

Additionally, when the target vehicle diagonal D is normal to the host vehicle, due to target vehicle rotation, a substantially more accurate rotation angle is determined.

Vehicle tire size is relatively constant, and the target vehicle body is easily identified, as will be understood by one skilled in the art. Therefore, the obstacle height used is a total height of the target vehicle body, for the current embodiment.

Referring again to FIG. 1, the other object classifying logic activates in response to the height and the width of the obstacle 18, 20 and 22 within other object parameters. For an obstacle having a narrow width (less than 1 meter) and less than approximately 2.5 meters high (computed after distance estimate), the controller 24 would conclude that it is a person 18. The other object parameters further include the width of the obstacle less than 2 meters and the height of the obstacle greater than a visual field of the sensor 14 for a telephone pole 20 or a tree. The other object parameters further include the width of the obstacle greater than 2 meters and the height of the obstacle greater than the visual field of the sensor for a wall designation 22.

Following analysis in the controller 24 as to what the obstacle appears, actuators 24 for other vehicle systems 33 activate in response to controller signals. One example is pre-crash systems, such as airbags and seat belt pre-tensioners, which are activated when a collision is imminent, as will be understood by one skilled in the art.

Figure 7:
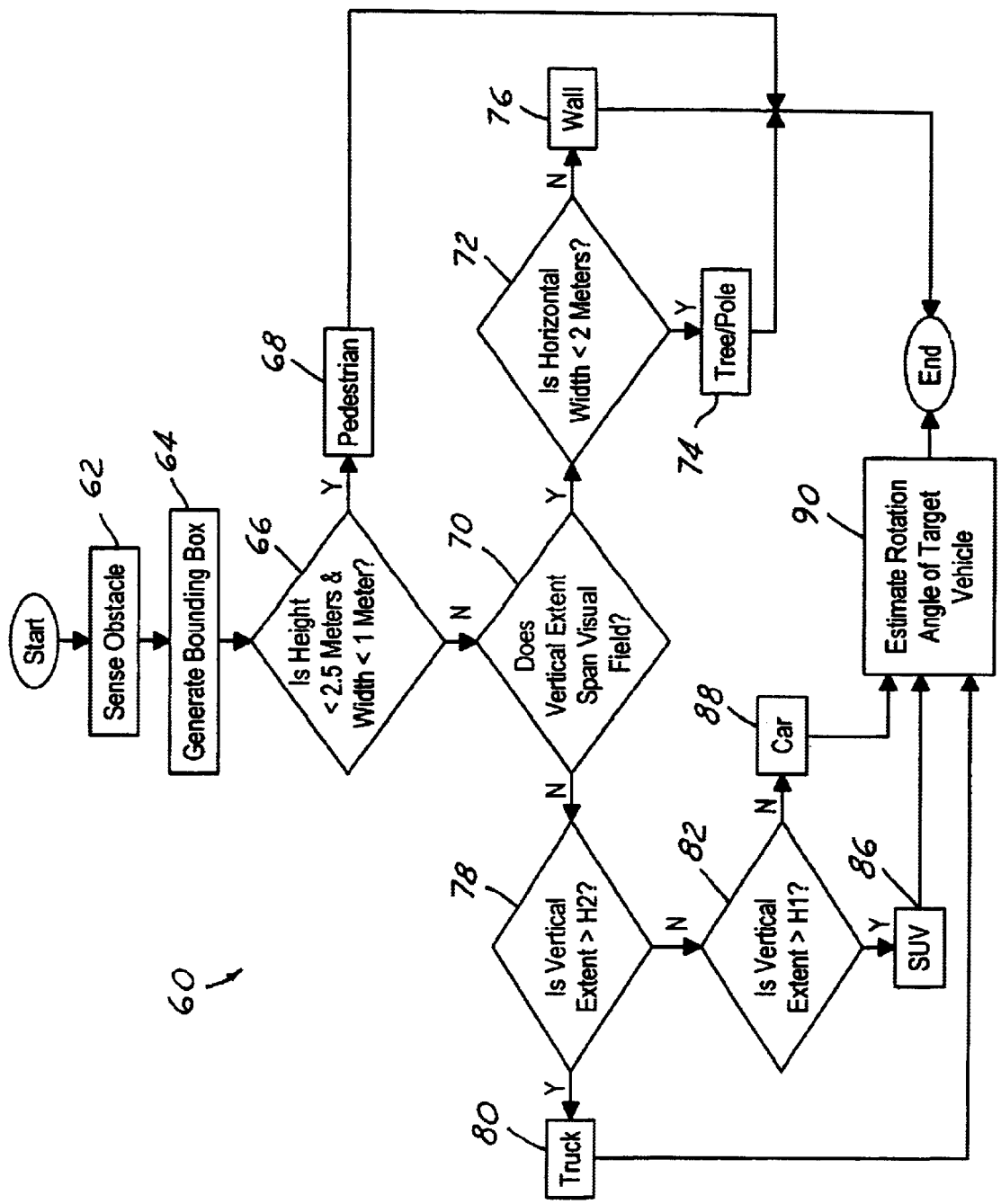
FIG. 7 is a block diagram of an obstacle classifying system for a host vehicle according to one embodiment of the present invention.

Referring to FIG. 7, a block diagram of a classifying system for a host vehicle, in accordance with one embodiment of the present invention, is illustrated. Logic starts in operation block 62 where an obstacle is sensed from a sensor on a host vehicle. The sensor data is received in the controller, and the bounding box for the obstacle is generated in operation block 64.

The analysis phase then begins with an inquiry in block 66 as to whether the obstacle has a height less than 2.5 meters and a width less than 1 meter. For a positive response, block 68 activates, and a pedestrian classification is made for the obstacle.

Otherwise, inquiry block 70 activates, and an inquiry is made as to whether the obstacle spans the visual field of the sensor.

For a positive response to inquiry block 70, an inquiry is made in block 72 as to whether the obstacle horizontal width is less than 2 meters. For a negative response, the obstacle is classified as a wall in operation block 76. Otherwise, the obstacle is classified a tree or a pole in operation block 74.

For a negative response to inquiry block 70, an inquiry is made in inquiry block 78 as to whether the obstacle vertical extent is greater than H2. For a positive response, operation block 80 activates, and the obstacle is classified as a truck. The rotation angle of the target vehicle (truck) is then estimated in operation block 90.

Otherwise, an inquiry is made in inquiry block 82 as to whether the vertical extent of the obstacle is greater than H1. For a positive response, operation block 86 activates, and the obstacle is classified as an SUV. The rotation angle of the target vehicle (SUV) is then estimated in operation block 90.

Otherwise, operation block 88 activates, and the obstacle is classified as a car in operation block 88. The rotation angle of the target vehicle (car) is then estimated in operation block 90.

In operation, a classifying method for a host vehicle including detecting an obstacle through at least one sensor coupled to the host vehicle is disclosed. The sensor generates an obstacle signal, which is received in the controller. The controller interprets the signal and generates a bounding box around an image of the obstacle. The bounding box includes a number of vertical pixels corresponding to a height of the obstacle and a number of horizontal pixels corresponding to a width of the obstacle. Vehicle classifying logic activates in response to the height and the width of the obstacle within vehicle parameters. Target vehicle classifying logic activates to classify the type of the target vehicle based on the obstacle height. Other classification factors include estimating a rotation angle of the target vehicle in relation to the host vehicle and eliminating ambiguity of approach angle by measuring closing vehicle velocity.

Other object classifying logic activates in response to the height and width of the obstacle within other object parameters. More specifically, the obstacle is classified based on at least one of the obstacle height and the obstacle width, as was previously discussed.

While the invention has been described in connection with one or more embodiments, it should be understood that the invention is not limited to those embodiments. On the contrary, the invention covers all alternatives, modifications, and equivalents, as may be included within the spirit and scope of the appended claims.

What is claimed is:

1. A classifying system for a host vehicle comprising: at least one sensor coupled to the host vehicle and detecting boundary data of an obstacle, said sensor further generating an obstacle signal in response to said boundary data; and a controller coupled to the host vehicle and receiving said obstacle signal, said controller generating a bounding box for said obstacle in response to said obstacle signal, said bounding box including at least one vertical pixel corresponding to a maximum height of said obstacle and at least one horizontal pixel corresponding to a maximum width of said obstacle, said controller including obstacle classifying logic classifying said obstacle in response to said height and said width and determining a rotation angle of approach of said obstacle.

2. The system of claim 1 further comprising an array of sensors detecting a position and a velocity of said obstacle.

3. The system of claim 1 wherein said obstacle comprises a target vehicle.

4. The system of claim 3 wherein said at least one sensor detects at least one inside corner of said target vehicle, and wherein said controller compares a distance between said inside corner of said target vehicle and a nearest side of said bounding box to a distance between an inside corner of said bounding box and an axis extending from an outer edge of said bounding box to a direction of travel of the host vehicle.

5. The system of claim 3 wherein said obstacle height comprises a body height of said target vehicle.

6. The system of claim 3 wherein said obstacle height comprises a total height of said target vehicle.

7. The system of claim 1 wherein said parameters include at least two different obstacle heights corresponding to different vehicle types.

8. An obstacle classifying method for a host vehicle comprising: detecting an obstacle through at least one sensor coupled to the host vehicle; generating an obstacle signal; receiving said obstacle signal in a controller coupled to the host vehicle; generating a bounding box around an image of said obstacle in response to said obstacle signal, said bounding box including a number of vertical pixels corresponding to a maximum height of said obstacle and a number of horizontal pixels corresponding to a maximum width of said obstacle; activating vehicle classifying logic in response to said height and said width of said obstacle within vehicle parameters; classifying a type of a target vehicle based on said obstacle height; estimating a rotation angle of said target vehicle in relation to the host vehicle; activating said vehicle classifying logic in response to said height and said width of said obstacle within other object parameters; and classifying said obstacle based on at least one of said obstacle height and said obstacle width.

9. The method of claim 8 further comprising: estimating all rotation angles of said target vehicle; and eliminating one of an angled away or an angled toward image of said target vehicle trough a measurement of closing velocity.

10. The method of claim 8 further comprising activating an actuator in response to either said step of classifying a type of a target vehicle or said step of classifying said obstacle.

11. An obstacle classifying system for a host vehicle comprising: at least one sensor coupled to the host vehicle and detecting boundary data of an obstacle and a velocity of said obstacle and a distance from said obstacle to the host vehicle, said sensor further generating an obstacle signal in response to said boundary data; and a controller coupled to the host vehicle and receiving said obstacle signal, said controller generating a bounding box for said obstacle in response to said obstacle signal, said bounding box including a number of vertical pixels corresponding to a maximum height of said obstacle and a number of horizontal pixels corresponding to a maximum width of said obstacle, said controller including vehicle classifying logic and other object classifying logic, said vehicle classifying logic activating in response to said height and said width of said obstacle within vehicle parameters, said other object classifying logic activating in response to said height and said width of said obstacle within other object parameters, said vehicle classifying logic classifying a type of a target vehicle based on said obstacle height, said vehicle classifying logic further estimating a rotation angle of said target vehicle in relation to the host vehicle, said vehicle classifying logic further determining a direction of travel of said target vehicle based on said obstacle velocity and said rotation angle, said other object classifying logic classifying said obstacle based on said obstacle height and said obstacle width.

12. The system of claim 11 further comprising an array of sensors detecting a position and a velocity of said obstacle.

13. The system of claim 11 wherein said at least one sensor detects at least one inside corner of said target vehicle, and wherein said controller compares a distance between said inside corner of said target vehicle and a nearest side of said bounding box to a distance between an inside corner of said bounding box and an axis extending from an outer edge of said bounding box to a direction of travel of the host vehicle.

14. The system of claim 11 wherein said obstacle height comprises a body height of said target vehicle.

15. The system of claim 11 wherein said obstacle height comprises a total height of said target vehicle.

16. The system of claim 11 wherein said vehicle parameters include at least two different obstacle heights corresponding to different vehicle types.

17. The system of claim 11 wherein said vehicle parameters include said width of said obstacle set at approximately 2 meters.

18. The system of claim 11 wherein said other object parameters include said width of said obstacle less than 1 meter and said height of said obstacle less than 2.5 meters for a pedestrian.

19. The system of claim 11 wherein said other object parameters include said width of said obstacle less than 2 meters and said height of said obstacle greater than a visual field of said at least one sensor for a telephone pole or a tree.

20. The system of claim 11 wherein said other object parameters include said width of said obstacle greater than 2 meters and said height of said obstacle greater than a visual field of said at least one sensor for a wall.

21. The system of claim 11 wherein said classifying logic and other object classifying logic include Hough transform logic.

* * * * *